US008930381B2

(12) United States Patent
Raghunathan et al.

(10) Patent No.: US 8,930,381 B2
(45) Date of Patent: Jan. 6, 2015

(54) METHODS AND SYSTEMS FOR RUNTIME DATA ANONYMIZATION

(75) Inventors: Balaji Raghunathan, Bangalore (IN);
Vishal Krishna Saxena, Bangalore (IN);
Venugopal Subbarao, Bangalore (IN);
Swaminathan Natarajan, Bangalore (IN)

(73) Assignee: Infosys Limited, Banagalore (IN)

( * ) Notice: Subject to any disclaimer, the term of this patent is extended or adjusted under 35 U.S.C. 154(b) by 202 days.

(21) Appl. No.: 13/111,411

(22) Filed: May 19, 2011

(65) Prior Publication Data

US 2012/0259877 A1 Oct. 11, 2012

(30) Foreign Application Priority Data

Apr. 7, 2011 (IN) .......................... 1200/CHE/2011

(51) Int. Cl.
*G06F 17/00* (2006.01)
*G06F 17/30* (2006.01)
*H04L 29/06* (2006.01)
*G06F 21/62* (2013.01)

(52) U.S. Cl.
CPC ................................ *G06F 21/6254* (2013.01)
USPC .............................................. 707/756; 726/1

(58) Field of Classification Search
USPC ......... 707/783, 999.105, 756, 757; 726/1, 27; 709/203
See application file for complete search history.

(56) References Cited

U.S. PATENT DOCUMENTS

| | | | | |
|---|---|---|---|---|
| 8,156,159 | B2 * | 4/2012 | Ebrahimi et al. | 707/804 |
| 8,185,931 | B1 * | 5/2012 | Reeves | 726/1 |
| 8,826,370 | B2 * | 9/2014 | Boukobza | 726/1 |
| 2003/0220927 | A1 | 11/2003 | Iverson et al. | |
| 2004/0136373 | A1 * | 7/2004 | Bareis | 370/392 |
| 2006/0074897 | A1 | 4/2006 | Fergusson | |
| 2007/0300306 | A1 * | 12/2007 | Hussain | 726/27 |
| 2008/0065665 | A1 | 3/2008 | Pomroy et al. | |
| 2008/0196098 | A1 * | 8/2008 | Cottrell et al. | 726/12 |
| 2009/0049511 | A1 | 2/2009 | Manickam et al. | |
| 2009/0049512 | A1 | 2/2009 | Manickam et al. | |
| 2009/0100527 | A1 * | 4/2009 | Booth et al. | 726/27 |
| 2009/0132419 | A1 | 5/2009 | Grammer et al. | |
| 2009/0132575 | A1 | 5/2009 | Kroeschel et al. | |
| 2011/0321120 | A1 * | 12/2011 | Saxena et al. | 726/1 |
| 2012/0246696 | A1 | 9/2012 | Boukobza | |

OTHER PUBLICATIONS

Infosys Technologies Limited, "The Need of Data Privacy Preservation in Offshore Operations" Apr. 2010, p. 1-4.
Infosys Technologies Limited, "Enabling Enterprise Data Privacy Data Masking as an Indispensible Technology" Oct. 2010, p. 1-8.

* cited by examiner

*Primary Examiner* — Marc Filipczyk
(74) *Attorney, Agent, or Firm* — Stephen M. Hertzler; Marc S. Kaufman; Reed Smith LLP

(57) ABSTRACT

System and methods for anonymizing data is disclosed. The method includes intercepting a communication, identifying sensitive data in the communication and transmitting data to an anonymization engine for masking. Masked data is received from the anonymization engine and transmitted to a client device.

20 Claims, 5 Drawing Sheets

METHODS AND SYSTEMS FOR RUNTIME DATA ANONYMIZATION

RELATED APPLICATION DATA

This application claims priority to Indian Patent Application No. 1200/CHE/2011, filed Apr. 7, 2011, which is hereby incorporated by reference in its entirety.

BACKGROUND

Information is the oxygen of enterprises. Enterprises need to store and process sensitive information in their production environment databases. This information often consists of employee, customer, partner and vendor records containing sensitive details like names of individuals, addresses, telephone numbers, emails, social security numbers, credit card information, health insurance details, health records, and financial records to name a few. Enterprises take steps to keep such sensitive data private both to protect their own interests and the interests of their clients, partners, and customers. Indeed, much of this data is required by law to be kept private. For example, the Payment Card Industry Data Security Standard ("PCI DSS") act makes it mandatory for credit card payment processing companies to maintain data confidentiality while storing, processing, and exchanging credit card data. Likewise, the United States Health Insurance Portability and Accountability Act ("HIPAA") mandates maintaining privacy of individually identifiable health data.

Still, enterprises need applications that utilize sensitive data to function and these applications require maintenance and testing. Application development and testing activities need realistic data for validations. To provide realistic data to a testing environment an enterprise may implement a data masking technique to mask actual data. Data masking may also be referred to as data obfuscation, data de-identification, data depersonalization, data scrubbing, data anonymization, data scrambling, and similar terms. Data masking modifies sensitive data to create life-like but false values. Data masking systems generally retain the look and feel of data to enable realistic testing.

To mask a dataset containing sensitive data, enterprises have employed in-situ data masking architectures. In these conventional architectures, a clone of a dataset is made and then a set of masking rules is applied to the cloned dataset, thereby producing a masked dataset. Developers may then be granted access to the masked dataset or the masked dataset may be altogether delivered to developers for testing. This conventional method, however, requires the enterprise itself to convert a large dataset and the dataset may become obsolete as the data in a production environment tends to change quickly. Additionally, because various developers may require different levels of masking (e.g., for internal development, only personal information such as credit card numbers may be masked to ensure employees cannot access them, but for external development pricing and sales information may additionally be masked to prevent the information from leaking to competitors), an enterprise may need to create several distinct masked datasets.

More modern systems may employ a data masking architecture having masking rules as part of a process of moving data from a source database to a target database. This may be implemented in a cloning process in similar fashion to in-situ architectures to prevent an unmasked clone of the dataset from even temporarily existing. However, such on-the-fly data masking architectures are implemented at the data access layer and, thus, are specific to the technology they are implemented on. An on-the-fly architecture must be custom built for a production environment, which is costly and time consuming. Additionally, such conventional architectures cannot operate cross-platform, such as from one database architecture to another.

Enterprises also employ data masking for outsourcing. For example, an enterprise may desire to give an outside enterprise access to a dataset but with sensitive data masked. Conventional methods would require a cloned masked dataset to be created. This may be cumbersome, though, because additional processes would be required to then integrate changes made by the outside enterprise to the cloned masked dataset back into the enterprise's production dataset. Further, additional systems would be required to ensure that both the cloned masked dataset and the production dataset to not get off sync as changes are made on the production side.

Further, sensitive data resides in emails, application files, and other data sources in addition to structured datasets. Sensitive data may be scattered throughout organizational computing devices and stored in varying types of files. Conventional masking solutions may assist with masking organized datasets but fail to provide data security for data outside of the datasets.

Conventional methods require expensive duplication of large datasets according to cumbersome systems. These methods require independent masked datasets to be created depending on the context for which the dataset will be shared. Moreover, these methods are specific to the technology they are implemented on and generally require expensive, custom made, architectures. Improved anonymization methods and systems are desired.

While systems and methods are described herein by way of example and embodiments, those skilled in the art recognize that systems and methods for runtime data anonymization are not limited to the embodiments or drawings described. It should be understood that the drawings and description are not intended to be limiting to the particular form disclosed. Rather, the intention is to cover all modifications, equivalents and alternatives falling within the spirit and scope of the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Disclosed embodiments provide computer-implemented methods and systems for dynamically masking sensitive data in a dataset. Dynamic masking may selectively mask data as it moves from a production environment to an application that may or may not reside locally. Dynamic masking may involve masking sensitive data to hide it from less privileged users of application software. For example, a call center employee may not be able to look at sensitive financial details of a high net-worth individual and yet be given access to other information about the individual to allow the employee to carry out their duties. The application could be, for example, a desktop client or a web based system. Dynamic data masking systems may intelligently determine masking rules based on a location and role of a user. Such systems may also consider country specific formats for sensitive fields that may vary country to country.

Dynamic data masking systems may additionally be configured to plug into strategic locations, such as web servers or message queues. This may allow dynamic data masking systems to operate independently of the technology employed in a database system. Such functionality may also require minimal code changes to an application.

While static masking may be useful in a non-production environment (e.g., masking by shuffling data in a dataset for testing purposes), static masking may not be useful in a production environment. In a production environment, runtime data may need to be masked to maintain privacy of data being transmitted, for example to an outsourcing company. Embodiments may intercept sensitive information at the presentation layer to dynamically mask runtime data, thus allowing for dynamically masking production data substantially in real-time as it is being transmitted.

Figure 1:
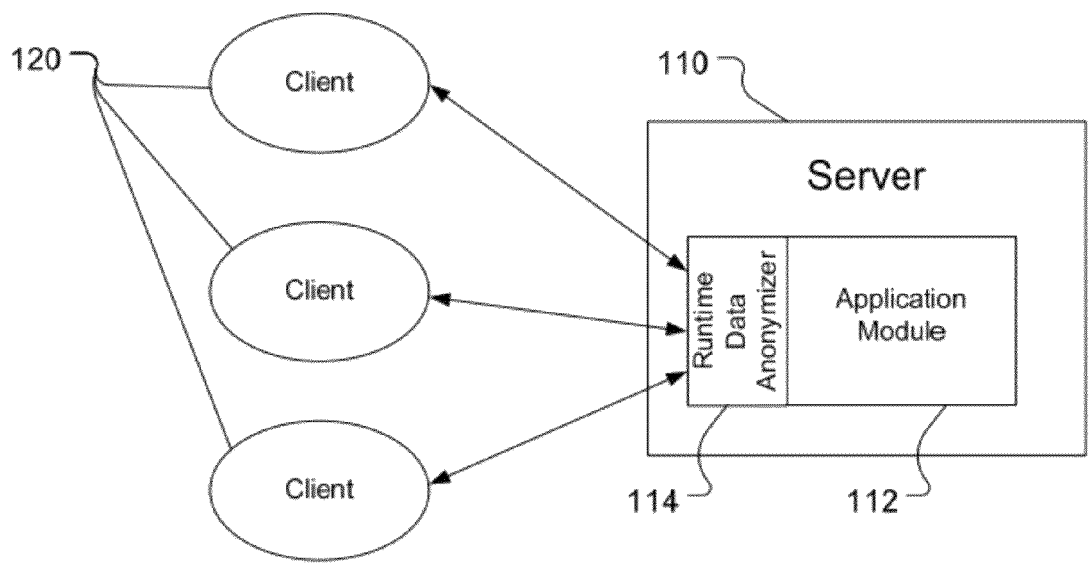
FIG. 1 shows an exemplary functional architecture of a dynamic masking system.

FIG. 1 shows an exemplary functional architecture of a dynamic masking system 100. A server 110 may host data including sensitive information for access by one or more client(s) 120. For example, server 110 may be a web server running APACHE. Server 110 may include an application module 112 configured to receive requests from one or more clients 120, for example hypertext transfer protocol ("HTTP") GET requests, retrieve the requested data, and return the requested data to the user. Of course, application module 112 may perform alternative functions, such as creating, modifying, or deleting data according to requests from the clients 120.

However, portions of the data requested by clients 120 may include sensitive information. Server 110 may include a runtime data anonymizer module 114 configured to intercept all data being transmitted from application module 112, determine whether any portions of the data contain sensitive information, and mask the sensitive information before the data is transmitted to clients 120. Runtime data anonymizer 114 may also be configured to intercept all data being received from clients 120, determine whether any portions of the data contain masked sensitive information, and unmask the sensitive information before the data is transmitted to application module 112.

Of course, while runtime data anonymizer module 114 is shown in FIG. 1 as being operatively coupled to the application module 112, the runtime data anonymizer functionality may be integrated into application module 112. In other embodiments a runtime data anonymizer module 114 may be implemented in a separate computing device, for example a front end server or a firewall device and may be configured to intercept all traffic to determine potentially sensitive information and mask such information before the information travels outside of a secure environment, such as into the internet. Thus, a data anonymizer module 114 may function as a server and intercept every client request or server response as per determined configurations, such as those stored in a rules repository dataset, and anonymize sensitive data in accordance to the determined configurations. A server or server computing device as used herein may be any computing device involved in the process of serving information, for example an application server or a proxy server.

Figure 2:
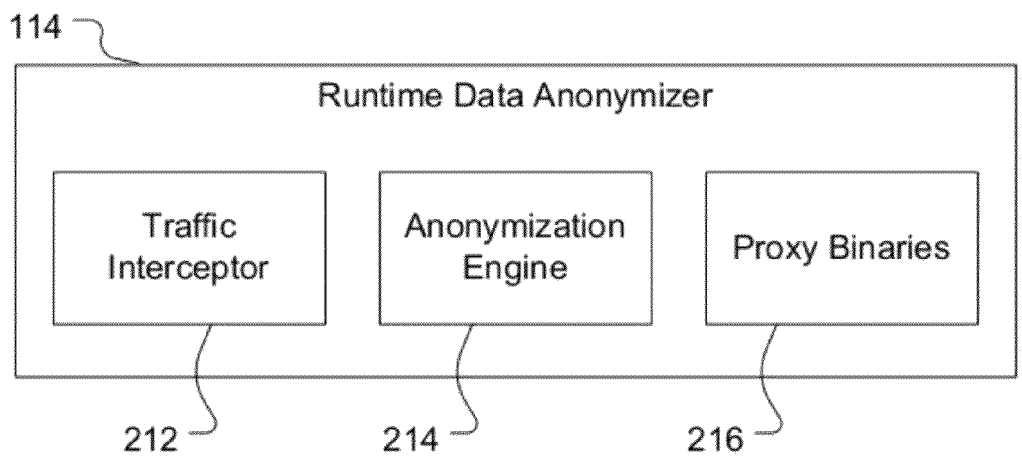
FIG. 2 shows exemplary functional components of a runtime data anonymizer module of FIG. 1.

FIG. 2 shows exemplary functional components of a runtime data anonymizer module 114 of FIG. 1. Runtime data anonymizer module 114 may include a traffic interceptor module 212, an anonymization engine module 214, and a proxy binaries module 216. Traffic interceptor module 213 may be configured to intercept communications, for example hypertext markup language ("HTML") communications or simple object access protocol ("SOAP") communications. In contrast to conventional masking systems that may be configured to intercept potentially sensitive data at the data access layer, embodiments may be configured to intercept communications and/or traffic at a higher layer, such as a business or presentation layer. Traffic interceptor 212 may be configured to intercept HTML, SOAP, or other presentation layer traffic to enable data masking independent of the structure of an underlying dataset. For example, a web service proxy may be configured to examine SOAP requests and responses and unmask/mask designated fields. Alternatively, for intercepting application requests and responses, a proxy server implementing a Network Application Framework can be used to unmask/mask designated fields.

For example, referring back to FIG. 1, application module 112 may access and transmit data from datasets of any format, for example datasets stored in ORACLE™, SQL Server, DB2, Sybase, IMS DB/DC, and other popular databases in various file formats such as fixed record length, delimited, XML, SWIFT, FED, and CHIPS on various operating systems such as MICROSOFT™ XP or VISTA™, Linux, or UNIX. However, independent of the underlying architecture, sensitive data received from and sent to application module 112 may be masked and unmasked. Traffic interceptor 212 may, thus, intercept the traffic independent of the format of the data or dataset.

A runtime data anonymizer module 114 may be implemented in various systems with no or minimal modification. Data-layer masking systems can only be configured for specific data sources. For example, if the application module 112 accesses data from Sybase, Oracle, and SQL servers, a data-layer masking system would need different data anonymizers for each of the Sybase, Oracle, and SQL servers. In contrast, runtime data anonymizer 114 can be used to mask data being accessed from multiple data sources, such as Sybase, Oracle, and SQL servers. These features of traffic interceptor module 212 may also allow a runtime data anonymizer module 114 to be deployed external to a server, in similar fashion to a firewall or proxy server.

Once traffic interceptor module 212 intercepts traffic, proxy binaries module 216 may parse the traffic to identify the communication. For example, proxy binaries module 216 may include multiple application adapters configured to parse the traffic into various fields within the communication. Proxy binaries module 216 may then invoke anonymization module 214 to identify sensitive data within the traffic and mask the identified sensitive data. For example, anonymization engine 214 may compare each field to identified sensitive fields in a rules repository data set. For each field identified as containing potentially sensitive data, anonymization engine 214 may then mask the data according to a rule identified in the rules repository dataset. After all potentially sensitive data in the traffic has been identified by anonymization engine module 214 and, if necessary, masked according to a masking rule, runtime data anonymizer 114 may transmit the traffic containing masked information downstream to one or more clients 120.

Runtime data anonymizer 114 may also be configured to intercept and de-mask traffic received from one or more clients 120 in similar fashion to how it masks traffic. Anonymization module 214 may generate deterministic values, as described in greater detail below, runtime data anonymizer 114 may de-mask incoming traffic and transmit the traffic downstream in its initially unmasked form. This may allow runtime data anonymizer 114 to operate independently of and transparently to an application module 112.

Runtime data anonymizer 114 may employ any masking transformation rules. Runtime data anonymizer 114 may include preconfigured masking transformation rules or may allow a user to define custom masking transformation rules. Exemplary masking transformation rules may include substitution, hashing, date shifting, and delta increment/decrement to name a few. Substitution may involve randomly replacing the contents of a data element with information that looks similar but is unrelated to the real data. Hashing may include providing masked characters (e.g., replacing a credit card number 1234-5678-9101-2345 with xxxx-xxxx-xxxx-2345). Date shifting may adjust all dates in a dataset by a specific amount (e.g., shift all date elements ninety days into the future). Delta increment/decrement may shift numbers a certain value (e.g., add 781 to every numeric value). Of course, other masking transformation rules may be implemented. Masking transformation rules may also utilize encryption/decryption and other security measures.

Masking transformation rules may be stored in any format, for example in eXtensible Markup Language ("XML"). Masking transformation rules may be in a reusable format, thereby allowing a user to load and/or modify previous rules in addition to allowing a user to create new custom rules.

Masking transformation rules may be regular expression based to recognize the content of a data element. For example, a masking transformation rule may be configured to delta increment a personal identification primary key by a determined amount (e.g., increment a social security number by 1234). However, while a primary key for a user residing in the United States may be a social security number having one format (i.e., having nine numeric digits), the primary key for a user residing in another country may have a different number of digits, may have alpha-numeric digits, and the like. Thus, masking rules may be configured to recognize regular expressions and to mask data elements according to regular expression based masking transformation rules. A user may select an appropriate format-specific masking technique for generating the masked value for regular expressions, such as for social security number and telephone number fields.

Runtime data anonymizer 114 may be configured to generate deterministic values. In other words, a runtime data anonymizer 114 may be configured to mask the same data element in the same way, independent of where or when the element comes from. For example, an employee number may reside in multiple pages in a website and either be linked or not. Runtime data anonymizer 114 may be configured to mask the same employee number in the same fashion independent of where the employee number is located. To perform this, masking rules may be configured to use the same non-random masking technique for relevant sensitive fields. For example, a first name field in a homepage and the first name field in a related page of the same website may be configured to apply the same non-random masking technique. For example, a first name "Matt" may be masked to "John" in both fields for the end-user.

Runtime data anonymizer 114 may also be configured to apply various access based masking techniques. For example, a dataset may define masking transformation rules to apply when various entities access data. For example, entity based rules may define that all data transmitted to a first entity should be masked according to a first set of masking transformation rules while all data transmitted to a second entity should be masked according to a second set of masking transformation rules. For example, data being transmitted to a testing company in the same country may require less aggressive data masking than data being transmitted to an outsourcing company in another country. Runtime data anonymizer 114 may be configured to automatically detect the entity that data is being transmitted to or received from and to apply a determined access based masking technique for that entity.

Of course, this is only an exemplary access based masking technique. Other access based masking techniques may be location based. For example, personal financial records may be masked in various fashions depending on the location (e.g., country) that data is being transferred to or from to comply with each location's respective privacy laws. Other access rules may be user specific, thereby allowing a specific masking technique to be applied to a specific user, for example a user associated with a personal login or having an access token. Still other access based masking techniques may be role based, thereby selectively masking data depending on the role of each user. These access rules may allow for security of sensitive data while maintaining separation of duties. By applying certain access based masking techniques according to the role of a user, project configuration necessary for logical division of work and reuse of data may be achieved.

In alternative embodiments, an anonymization engine 214 may also be implemented to perform static masking. In other words, a dataset may be transmitted through an anonymization engine 214 to generate a cloned masked dataset. The static masked dataset may be useful, for example, for testing and reporting.

Figure 3:
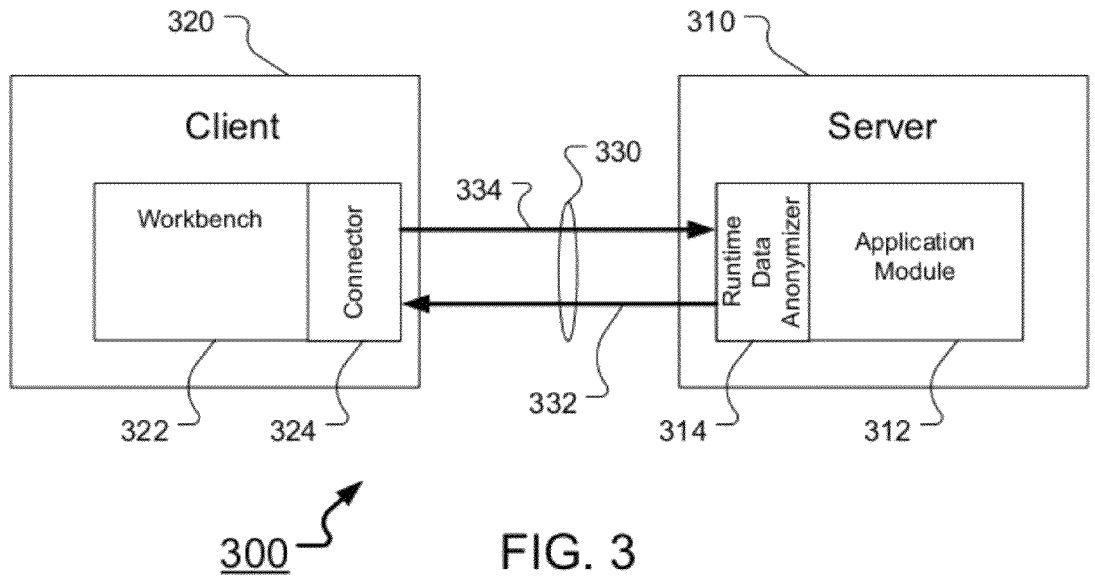
FIG. 3 shows an exemplary workbench module for configuring a dynamic masking system.

FIG. 3 shows an exemplary workbench module for configuring a dynamic masking system 300. System 300 includes a server computing device 310 operatively coupled to a client computing device 320. Server computing device 310 may operate in similar fashion to server computing device 110 shown in FIG. 1. Runtime data anonymizer 314 may be configured to mask data according to the context that the data will be used and/or accessed. For example, runtime data anonymizer 314 may be configured to identify the role of client computing device 320 (or the location of client computing device 320, the role of a user using client computing device 320, etc.), intercept data being transmitted to client computing device 320 and data being received from client computing device 320, and mask the intercepted data being transmitted to client computing device 320 and de-mask the intercepted data being transmitted from the client computing device 320. This may all occur substantially in real-time. The communications may, for example, be from a browser on the client computing device 320 requesting an HTTP webpage and from a server computing device transmitting the webpage or may be a request from an application whose interface communicates with a backend data store on server computing device 310.

Figure 4:
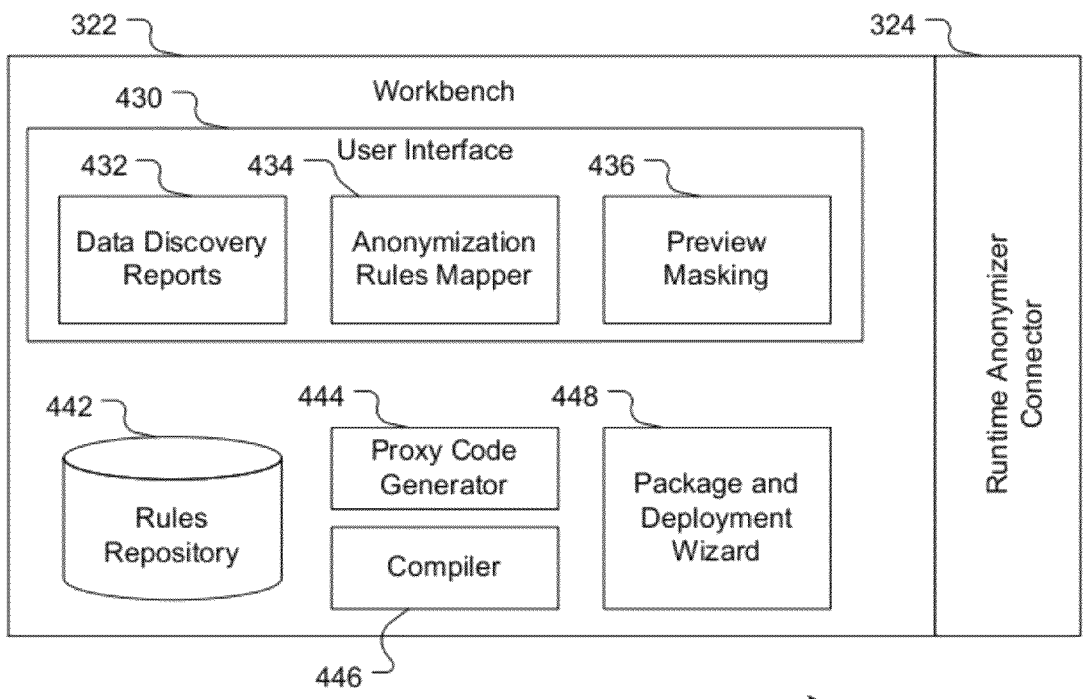
FIG. 4 shows exemplary functional components of a workbench module of FIG. 3.

A client computing device 320, thus, may access masked data transmitted from server computing device 310 through user interfaces such as those provided by browsers and other applications. A client computing device 320 may also have a workbench module 322 provided thereon configured to allow a user to initialize or modify data masking techniques. FIG. 4 shows exemplary functional components of a workbench module 322 of FIG. 3. Workbench module 322 may include a runtime anonymizer connector 324 configured to allow workbench module 322 to interact directly with runtime data anonymizer module 314. For example, runtime anonymizer connector 324 may be configured to authenticate with runtime data anonymizer 314 to allow a user interacting with workbench module 324 to initialize or modify data masking techniques performed by runtime data anonymizer 314.

Workbench module 322 may also include a user interface 420 configured to transmit for display on a display device (e.g., a monitor) a user interface to allow a user to perform various functions, such as view reports, map anonymization rules, and preview masked data. A data discovery reports module 432 may be configured to analyze datasets and provide reports of data in the datasets. For example, data discovery reports module 432 may provide a report identifying potentially sensitive data elements and identifying data relationships. A user may then interact with an anonymization rules mapper module 434 to mark various data as sensitive and to define various data masking rules. These rules may be context specific and may generate masked data deterministically throughout all data transmitted from a data source, such as server computing device 310. Once rules are generated, a preview masking module 436 may provide masked data to a user interface 430 to allow a user to determine if the data appears sufficiently masked. A user may also interact with the user interface module 430 to modify or delete existing rules.

Figure 5:
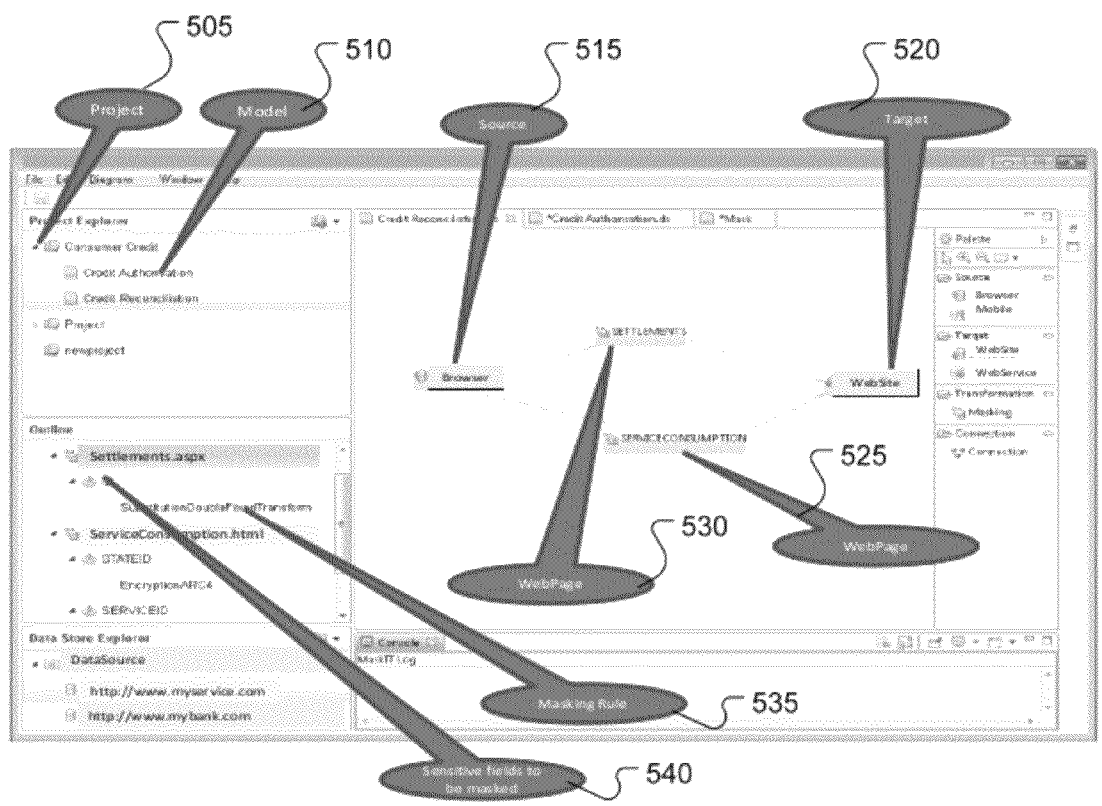
FIG. 5 shows an exemplary screenshot of a user interface of a workbench module.

FIG. 5 shows an exemplary screenshot 500 of a user interface 420 of a workbench module 322. Screenshot 500 shows that a user may create one or more projects 505 and within each project one or more models 510 for dynamic masking. The system may be used to mask one or more webpages 525 and 530 delivered from a website 520 to a browser 515. Through the user interface 420, a user may identify sensitive fields to be masked 540 and a masking rule to apply to each sensitive field 535.

A user may interact with anonymization rules mapper 434 to select predefined data masking rules and techniques or to define their own custom data masking rules. These rules may specify relations between multiple data items to generate deterministic values. Each rule defined by a user interacting with anonymization rules mapper 434 may be stored in rules repository 442. A proxy code generator module may be configured to generate code for a proxy interface to anonymize data. A compiler module 446 may then compile the code for a proxy interface. A package and deployment wizard module 448 may then deploy or install the compiled proxy code and any associated libraries to the runtime data anonymizer 314. In this fashion, a user of workbench module 322 may initialize, modify, and remove data masking rules in runtime data anonymizer 314.

The architecture shown in FIG. 3 illustrates that data masking rules may be initialized and modified from any computing device 320 operatively coupled to server computing device 310. In this fashion, a user may not need to directly access the server computing device 310 to change data masking rules. This may be useful, for example, if an entity decides to provide access to their data to a new outsourcing partner and needs to setup new data masking rules that are context specific to the new outsourcing partner. Of course, in other embodiments a user may directly access server computing device 310 to initialize and modify data masking rules.

While embodiments generally refer to masking data, masking data elements, and the like, embodiments may be useful for masking any type of interceptable transmission, for example transmissions that may be intercepted in the presentation layer, such as web pages (e.g., HTML pages). Data masking may additionally include masking associated metadata and deterministic values may be generated for metadata as well.

Embodiments may also provide additional features. For example, some embodiments may provide incremental masking (e.g., masking only newer data), de-masking (to generate original values), filtering (i.e., masking only the subset), role based access, schedule batch processing, and reporting. For example, workbench module 322 may include a user interface module configured to de-mask masked data to provide a user with original data values. This may be useful, for example, for an authorized user to access original data from outside of a secure network while maintaining data privacy by transmitting masked data over a public network (e.g., the internet).

Figure 6:
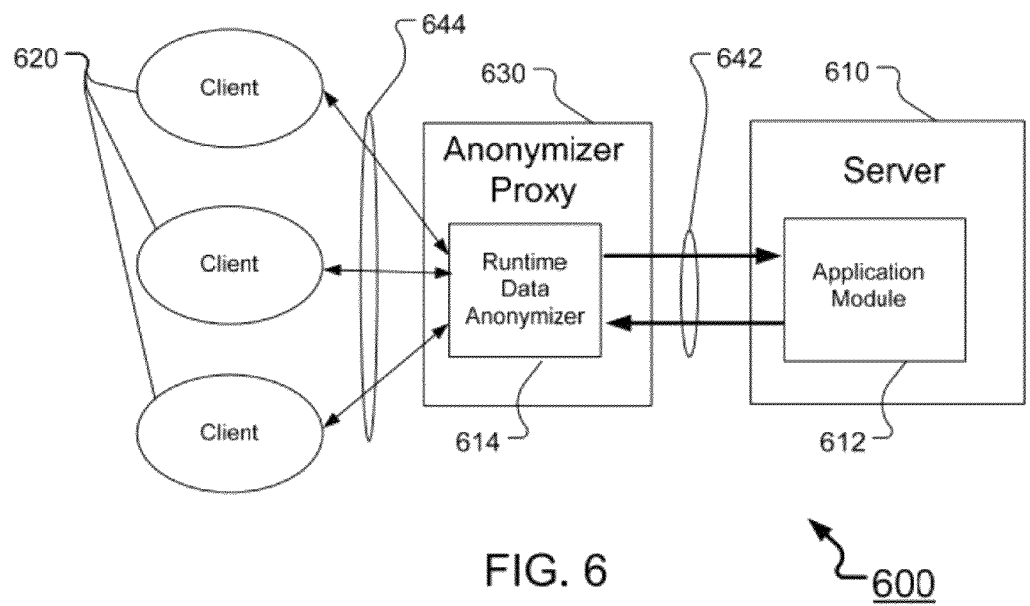
FIG. 6 shows an exemplary runtime data anonymizer module installed in an anonymizer proxy computing device independent from a server computing device.

Further, embodiments may leave underlying data unchanged. For example, runtime data anonymizer module 114 shown in FIG. 1 may be configured to intercept and provide context-based (e.g. role based) masking of data without modifying underlying data stored on server computing device 110. Alternatively, as shown in FIG. 6, runtime data anonymizer module 614 may be installed in an anonymizer proxy computing device 630 independent from server computing device 610. In this fashion, an application module 612, such as an APACHE server module, may transmit and receive 642 unmasked data in conventional fashion, runtime data anonymizer 614 may be configured to intercept the transmissions and apply context based masking of the data and metadata in the transmissions, and transmit 644 masked data to the appropriate downstream client(s) 620. Likewise, runtime data anonymizer module 614 may receive 644 masked data, de-mask the data, and transmit unmasked data to application module 612.

Figure 7:
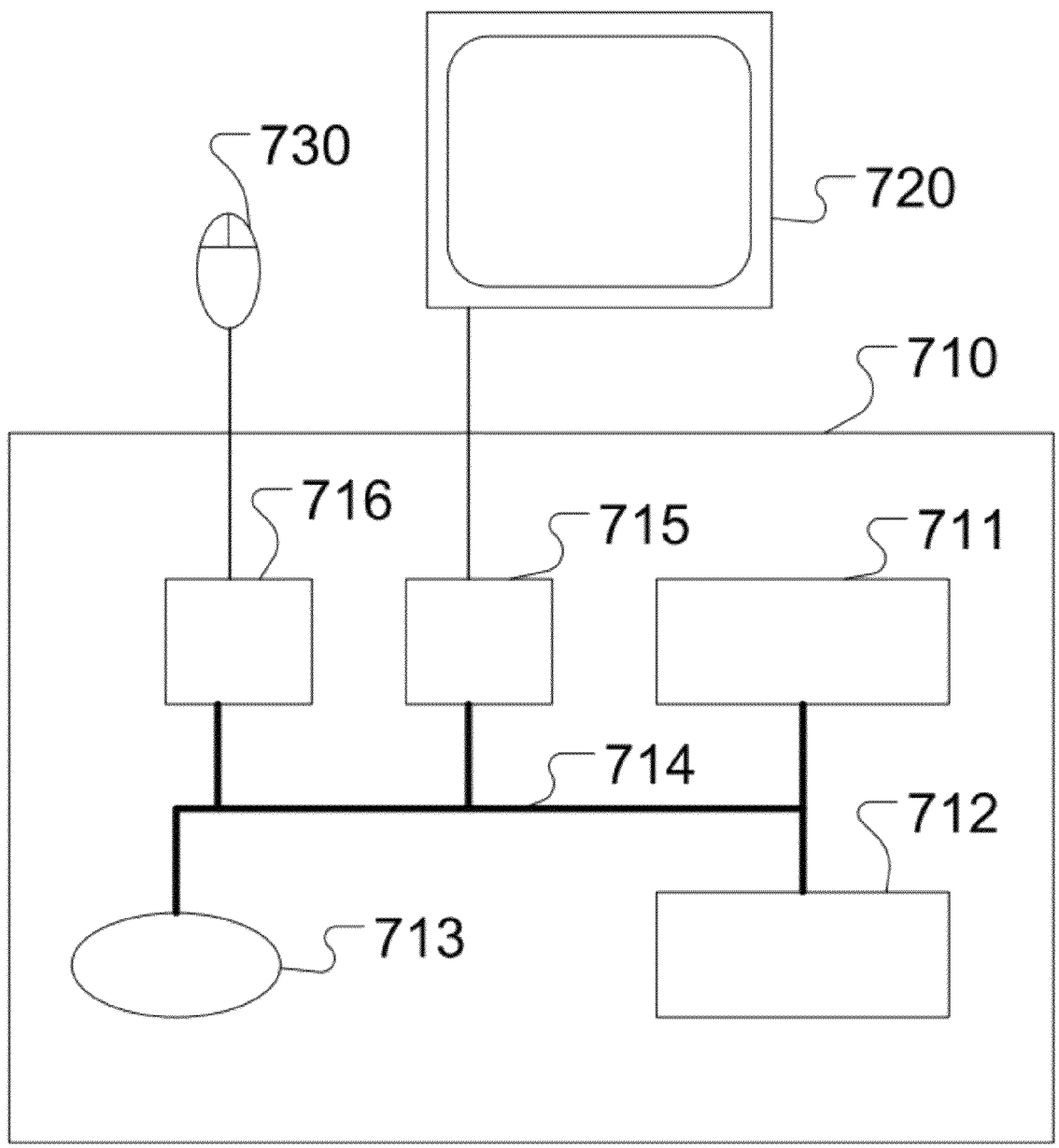
FIG. 7 shows an exemplary computing device useful for performing processes disclosed herein.

These embodiments may be implemented with software, for example modules executed on computing devices such as computing device 710 of FIG. 7. Of course, modules described herein illustrate various functionalities and do not limit the structure of any embodiments. Rather the functionality of various modules may be divided differently and performed by more or fewer modules according to various design considerations.

Computing device 710 has one or more processing device 711 designed to process instructions, for example computer readable instructions (i.e., code) stored on a storage device 713. By processing instructions, processing device 711 may perform the steps and functions disclosed herein. Storage device 713 may be any type of storage device (e.g., an optical storage device, a magnetic storage device, a solid state storage device, etc.), for example a non-transitory storage device. Alternatively, instructions may be stored in remote storage devices, for example storage devices accessed over a network or the internet. Computing device 710 additionally has memory 712, an input controller 716, and an output controller 715. A bus 714 operatively couples components of computing device 710, including processor 711, memory 712, storage device 713, input controller 716, output controller 715, and any other devices (e.g., network controllers, sound controllers, etc.). Output controller 715 may be operatively coupled (e.g., via a wired or wireless connection) to a display device 720 (e.g., a monitor, television, mobile device screen, touch-display, etc.) in such a fashion that output controller 715 can transform the display on display device 720 (e.g., in response to modules executed). Input controller 716 may be operatively coupled (e.g., via a wired or wireless connection) to input device 730 (e.g., mouse, keyboard, touch-pad, scroll-ball, touch-display, etc.) in such a fashion that input can be received from a user.

Of course, FIG. 7 illustrates computing device 710, display device 720, and input device 730 as separate devices for ease of identification only. Computing device 710, display device 720, and input device 730 may be separate devices (e.g., a personal computer connected by wires to a monitor and mouse), may be integrated in a single device (e.g., a mobile device with a touch-display, such as a smartphone or a tablet), or any combination of devices (e.g., a computing device operatively coupled to a touch-screen display device, a plurality of computing devices attached to a single display device and input device, etc.). Computing device 710 may be one or more servers, for example a farm of networked servers, a clustered server environment, or a cloud network of computing devices.

Embodiments have been disclosed herein. However, various modifications can be made without departing from the scope of the embodiments as defined by the appended claims and legal equivalents.

What is claimed is:

1. A computer-implemented method for anonymizing data by one or more computing devices, said method comprising:
   intercepting, by at least one of the one or more computing devices, a communication between a server computing device and a client computing device;
   identifying, by at least one of the one or more computing devices, a sensitive data field in the communication;
   determining, by at least one of the one or more computing devices, whether the communication is being transmitted to the client computing device or whether the communication is being received from the client computing device;
   performing, by at least one of the one or more computing devices, a transformation on data in the sensitive data field to generate transformed data, wherein the transformation comprises:
      de-masking-masked data in the sensitive data field such that the transformed data includes sensitive data based at least in part on a determination that the communication is being received from the client computing device; and
      masking, by at least one of the one or more computing devices, sensitive data in the sensitive data field such that the transformed data includes masked data based at least in part on a determination that the communication is being transmitted to the client computing device; and
   transmitting, by at least one of the one or more computing devices, the transformed data, wherein the transformed data includes sensitive data and is transmitted to an application on the server computing device when de-masking is performed and wherein the transformed data includes masked data and is transmitted to the client computing device when masking is performed.

2. The method of claim 1, wherein the sensitive data is masked according to a masking rule.

3. The method of claim 2, further comprising:
   identifying, by at least one of the one or more computing devices, a masking context including one of a user identification, a role, and a location of a user the sensitive data is to be transmitted to; and
   selecting, by at least one of the one or more computing devices, the masking rule from a plurality of masking rules according to the masking context.

4. The method of claim 1, wherein the sensitive data is de-masked according to a masking rule.

5. The method of claim 1, wherein the one or more computing devices are part of the server computing device.

6. The method of claim 1, wherein the intercepting occurs at the presentation layer.

7. The method of claim 1, wherein identifying comprises comparing one or more fields in the communication with a set of sensitive fields, wherein the set of sensitive fields is received from a client workbench.

8. The method of claim 7, wherein the client workbench comprises:
   a rules repository configured to receive one or more masking rules from a user;
   a proxy code generator module configured to generate code for a proxy interface;
   a compiler module configured to compile the proxy code; and
   a deployment module configured to deploy the compiled proxy code on a server computing device.

9. The method of claim 1, wherein de-masking-masked data in the sensitive data field such that the transformed data includes sensitive data comprises de-masking masked data in the sensitive data field based at least in part on a determination that the communication is being received from the client computing device and is being sent to the server computing device.

10. A system for anonymizing data, the system comprising:
    one or more processors; and
    one or more memories operatively coupled to at least one of the one or more processors and having instructions stored thereon that, when executed by at least one of the one or more processors, cause at least one of the one or more processors to:
       intercept a communication between a server computing device and a client computing device;
       identify a sensitive data field in the communication;
       determine whether the communication is being transmitted to the client computing device or whether the communication is being received from the client computing device;
       perform a transformation on data in the sensitive data field to generate transformed data, wherein the transformation comprises:
          de-masking masked data in the sensitive data field such that the transformed data includes sensitive data based at least in part on a determination that the communication is being received from the client computing device; and
          masking sensitive data in the sensitive data field such that the transformed data includes masked data based at least in part on a determination that the communication is being transmitted to the client computing device; and
       transmit the transformed data, wherein the transformed data includes sensitive data and is transmitted to an application on the server computing device when de-masking is performed and wherein the transformed data includes masked data and is transmitted to the client computing device when masking is performed.

11. The system of claim 10, wherein the instructions that, when executed by at least one of the one or more processors, cause at least one of the one or more processors to identify sensitive data in the communication further cause at least one of the one or more processors to compare one or more fields in the communication with a set of sensitive fields, wherein the set of sensitive fields is received from a client.

12. The system of claim 10, wherein the sensitive data is masked according to a masking rule.

13. The system of claim 12, wherein at least one of the one or more memories has further instructions stored thereon that, when executed by at least one of the one or more processors, cause at least one of the one or more processors to:

identify a masking context including one of a user identification, a role, and a location of a user the sensitive data is to be transmitted to; and select the masking rule from a plurality of masking rules according to the masking context.

14. The system of claim 10, wherein the intercepting occurs at the presentation layer.

15. At least one non-transitory computer-readable medium storing computer-readable instructions that, when executed by one or more computing devices, cause at least one of the one or more computing devices to:

intercept a communication between a server computing device and a client computing device;

identify a sensitive data field in the communication;

determine whether the communication is being transmitted to the client computing device or whether the communication is being received from the client computing device;

perform a transformation on data in the sensitive data field to generate transformed data, wherein the transformation comprises:

de-masking masked data in the sensitive data field such that the transformed data includes sensitive data based at least in part on a determination that the communication is being received from the client computing device; and masking sensitive data in the sensitive data field such that the transformed data includes masked data based at least in part on a determination that the communication is being transmitted to the client computing device; and transmit the transformed data, wherein the transformed data includes sensitive data and is transmitted to an application on the server computing device when de-masking is performed and wherein the transformed data includes masked data and is transmitted to the client computing device when masking is performed.

16. The at least one non-transitory computer-readable medium of claim 15, wherein the sensitive data is masked according to a masking rule.

17. The at least one non-transitory computer-readable medium of claim 16, further storing computer-readable instructions that, when executed by at least one of the one or more computing devices, cause at least one of the one or more computing devices to:

identify a masking context including one of a user identification, a role, and a location of a user the sensitive data is to be transmitted to; and select the masking rule from a plurality of masking rules according to the masking context.

18. The at least one non-transitory computer-readable medium of claim 15, wherein the sensitive data is de-masked according to a masking rule.

19. The at least one non-transitory computer-readable medium of claim 15, wherein the intercepting occurs at the presentation layer.

20. The at least one non-transitory computer-readable medium of claim 15, wherein the instructions that, when executed by at least one of the one or more computing devices, cause at least one of the one or more computing devices to identify sensitive data in the communication further cause at least one of the one or more computing devices to compare one or more fields in the communication with a set of sensitive fields, wherein the set of sensitive fields is received from a client.

* * * * *